Feb. 28, 1967 A. REINDL 3,307,106
PULSE MODULATED DUPLEX RADIO COMMUNICATION SYSTEM WITH INTERFERENCE PREVENTION MEANS
Filed Aug. 26, 1964
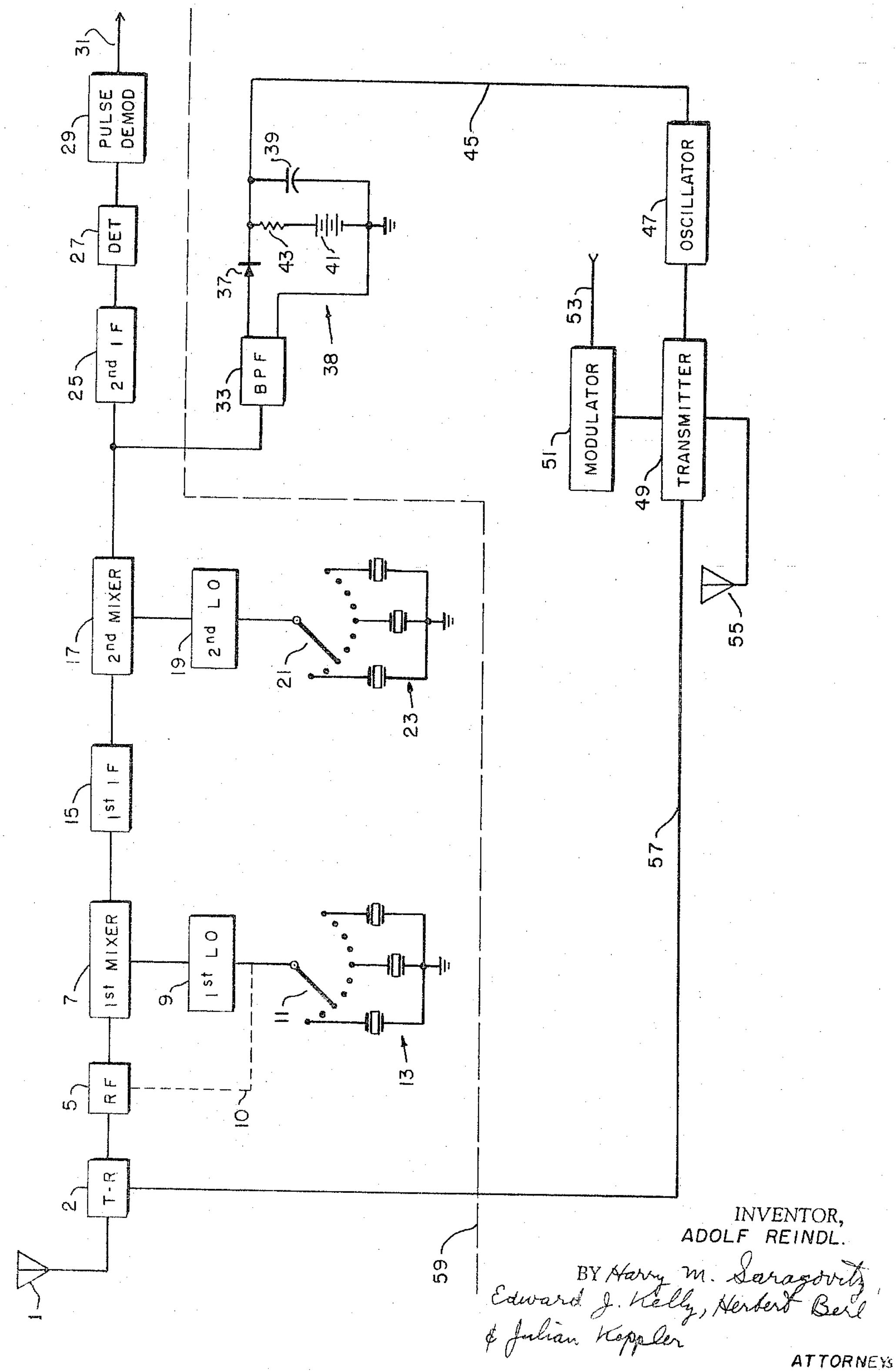
INVENTOR,
ADOLF REINDL.
BY Harry M. Saragovitz, Edward J. Kelly, Herbert Berl & Julian Keppler
ATTORNEYS 3,307,106

PULSE MODULATED DUPLEX RADIO COMMUNICATION SYSTEM WITH INTERFERENCE PREVENTION MEANS

Adolf Reindl, Long Branch, N.J., assignor to the United States of America as represented by the Secretary of the Army Filed Aug. 26, 1964, Ser. No. 392,356
6 Claims. (Cl. 325—21)

The invention described herein may be manufactured and used by or for the Government for governmental purposes without the payment of any royalty thereon.

This invention relates to a novel radio transceiver and to a communication network utilizing a plurality of such novel transceivers.

The present invention is useful in a duplex radio communication network in which a plurality of stations or transceivers are distributed at random over a given area and communication between pairs of stations is carried on by means of pulse modulated carrier waves, each station being assigned a different carrier frequency for transmission. At any station of such a system or network, if operated in the duplex mode, i.e., simultaneous transmission and reception, the receiver will be blanked or blocked during transmission due to the action of a transmit-receive (t-r) switch in the receiver signal path. This of course will result in a loss of part of the received signal, however since the pulse repetition rates of the transmitted and received signal will, therefore, still be intelligible despite the the transmitted and received pulses of radio frequency will coincide or interfere with each other at a rate equal to the difference in the pulse repetition rates of the transmitted and received signals. The maximum and minimum pulse repetition rates are chosen so that the loss of received pulses due to this interference from the transmitted pulses of the same set or station is tolerable and the received signal will, therefore, still be interligible despite the loss of an occasional received pulse. Each receiver is tunable to all of the transmitter frequencies of the system and thus receiver selectivity is normally utilized to select a desired transmission and reject undesired ones. However, if a station is receiving a transmission from a distant station and another nearby station is transmitting on a neighboring frequency or channel, the receiver selectivity will not be sufficient to reject the strong nearby transmission and interference in the form of frequency crosstalk will result. The interference will cause additional degradation of weak desired signals by masking or swamping any received desired pulses with coincidence with the interfering pulses. In accordance with the present invention this interference is nullified or substantially reduced by synchronizing or locking in phase the transmitters of all nearby stations. Thus the interference will occur during the time that the receiver is normally blocked by the action of the transmit-receive switch and the effect of such interference will be minimized.

It is, therefore, an object of this invention to provide an improved radio communication network or system.

It is a further object of this invention to provide a novel transceiver for use in pulse type radio communication systems.

A further object of the invention is to minimize interference between stations in a pulse-type duplex radio communication system.

Other objects and advantages will become apparent from the following detailed description and drawing, the sole figure of which is a circuit diagram of a typical transceiver which comprises a single station of a system or network composed of a plurality of such transceivers distributed at random over a given area. In the drawing, the circuitry above the dashed line 59 comprises a more or less conventional dual conversion receiver comprising antenna 1, transmit-receive switch 2, radio frequency amplifier 5, first mixer 7, first local oscillator 9, first intermediate frequency amplifier 15, second mixer 17, second local oscillator 19, second intermediate frequency amplifier 25, detector 27 and pulse demodulator 29. The radio output of the receiver appears at lead 31. Incoming signals pass through transmit-receive switch 2, and are amplified by RF amplifier 5 which is gang-tuned with first local oscillator 9 as indicated by the mechanical connection 10. The tuning of the first and second local oscillators is of the decade type. Each local oscillator is tunable to any one of ten frequencies determined by banks of ten crystals 13 and 23 (three of which are shown) selectively connectable to the respective local oscillators by means of ten-position switches 11 and 21. An illustrative communication system may comprise one hundred stations and one hundred different frequencies or channels. The RF amplifier 5 has a bandwidth sufficient to pass ten of these channels at each setting of the switch 11, which tunes the RF amplifier as well as first local oscillator 9. The first IF amplifier has a bandwidth wide enough to pass ten of the one hundred channels. Thus for each of the ten positions of the switch 11, ten different channels will be passed by the first IF amplifier and be applied to the second mixer 17. Any one of these ten channels can then be selected by tuning the second local oscillator 19 by means of the ten-position selector switch 21 and the ten crystals 23 connected thereto. The second IF amplifier 25 is wide enough to pass only the desired one of the signals in the output of the second mixer 17. Thus the first local oscillator tuning provides a coarse adjustment of the receiver tuning and the second local oscillator provides fine tuning. The detector 27 removes the carrier frequency from the signal leaving a train of modulated video pulses which are applied to pulse demodulator 29. The intelligence appears at the lead 31.

The transmitter 49 produces pulses of radio frequency which are applied to antenna 55. The carrier frequency of each transmitter in the system is made different and each such different frequency defines a different channel. The repetition rate of the transmitted pulses is determined by the frequency of oscillator 47, which is arranged to trigger the transmitter once during each cycle of its oscillation. The intelligence to be transmitted is applied to modulator 51 via lead 53. The modulator 51 modulates the train of RF pulses emitted by the transmitter in accordance with any of the well known types of pulse modulation, for example, pulse position, pulse amplitude or pulse width modulation. Simultaneously with the triggering of the transmitter, the transmit-receive switch 2 is actuated by means of a pulse on lead 57. This pulse closes the t-r switch to prevent the transmitted pulse from entering the receiver. The pulse repetition rate of each transmitter is normally different, but all must be at least twice the frequency of the highest modulation frequency to be transmitted.

The operation of the station is as follows. Under normal conditions, that is, no interference from nearby transmitters, the pulse repetition rate of the transmitter is determined by the free-running frequency of oscillator 47. All of the transmitter oscillators 47 will have slightly different free-running frequencies, none of which are multiples or harmonics of others. For example, all of the free-running pulse repetition rates may fall between 9 and 11 kc. Thus any two stations may communicate with each other simultaneously or in the duplex mode with minimum loss of received signal. The receiver is blocked by the t-r switch during transmission but since the received and transmitted pulse repetition rates are different and not harmonically related, the loss of received signal due to the transmitted signal of the same station is minimized. The transmitted and received pulses will coincide with each other periodically at the rate of the difference between the transmitted and received signal pulse repetition rates and a certain number of received pulses will be lost, however, the system is designed so that this loss due to the station's own transmitter can be tolerated without substantial degradation of the received intelligence. However, in the event that the receiver of a station is tuned to a distant transmitter and there are one or more other nearby stations transmitting on adjacent or nearby channels, the frequency crosstalk from these nearby transmitters results in the masking or swamping of the weaker desired signal. Even though the receiver is tuned to accept the desired distant channel and reject the strong nearby ones, practical filters cannot be designed to yield more than about 40 db rejection of adjacent channels. Hence a strong nearby transmitter on a nearby channel will interfere with the desired signal by saturating or overloading the front end of the receiver thereby effectively blocking the receiver during the interfering transmitter's pulses. Also, the receiver output will contain both the desired and the interfering transmission and this crosstalk may render both unintelligible. In accordance with the present invention, this interference is prevented by synchronizing or locking in phase all nearby interfering transmitters so that the emitted pulses of all such transmitters are locked in frequency and phase. Since all receivers are blocked by their t-r switches during transmission from the same station, the t-r switches will then block the interference from all nearby synchronized transmitters. The circuitry for accomplishing this synchronization is the band pass filter 33 and threshold detector 38. As stated above, the second IF amplifier 25 is narrowly tuned to the frequency of the desired signal, however during periods of interference the output of the second mixer 17 will contain, in addition to the desired signal, signals from a band of channels on either side of desired channel to which the receiver is tuned. For example, if the system contains one hundred channels, the first IF amplifier would be designed to pass ten adjacent channels and the output of the second mixer 17 would contain up to ten adjacent channels with the desired channel at the frequency of the second IF amplifier 25. As explained above, frequency crosstalk will cause strong interfering signals from nearby transmitters which are present in the output of the second mixer to leak through the second IF amplifier. In accordance with the present invention, the band pass filter 33 is connected to the output of the second mixer and is tuned to the same center frequency as the second IF amplifier 25 but is of wider bandwidth. The bandwidth of filter 33 is made wide enough to include all of the channels on either side of the desired channel which will leak through the second IF amplifier in sufficient strength to interfere with the desired signal. Thus the filter may, for example, be wide enough to pass three or four channels on either side of the desired channel. The output of filter 33 is applied to threshold detector 38 which comprises diode 37, bias source 41, resistor 43 and capacitor 39. The threshold detector is arranged to rectify or detect signals applied thereto which exceed a threshold voltage determined by the magnitude of the D.C. bias source 41. The source 41 has its positive terminal connected to the cathode of diode 37 and therefore the diode will not pass any voltage applied thereto from filter 33 which has a peak amplitude less than the D.C. voltage of source 41. This D.C. voltage is chosen so that the desired signal to which the receiver is tuned in the output of filter 33 will not exceed the threshold and will provide no output from 38. However, strong interfering signals will have amplitudes sufficient to produce an output from the threshold detector. The resistor 43 and capacitor 39 form a low pass filter for removing the carrier frequency from the rectified interfering pulse trains. The voltage at lead 45 will be direct current with an A.C. ripple superimposed thereon. The ripple will be caused by the strongest interfering signal in the output of filter 33. The output of threshold detector 38 is applied to oscillator 47 via lead 45 to provide a synchronizing signal therefor. Therefore the oscillator 47 will cease to be free-running in the presence of strong interfering signals on a nearby channel and will become synchronized with the interfering transmitter. Thus the pulse train output of transmitter 49 will become locked in frequency and phase with the pulses of the nearby interfering transmitter and the action of the t-r switch 2 will prevent the interference from entering the receiver. Of course this means that no more synchronizing pulses will be available on lead 45, but as soon as the transmitters drift out of synchronism the pulses will reappear on lead 45 to pull them back into synchronism. The result will be a substantial reduction in interference.

While the invention has been described in connection with an illustrative embodiment, many modifications thereof are possible without departing from the inventive concepts disclosed herein. Accordingly, the invention should be limited only by the scope of the appended claims.

What is claimed is:

1. A communication system comprising a plurality of stations, each of said stations comprising a transceiver adapted for duplex operation, each said transceiver comprising a transmitter adapted to emit a train of modulated radio frequency pulses, each of said transmitters having a different carrier frequency each defining a different channel, the pulse repetition rate of each of said transmitters being determined by a normally free-running oscillator, each of said oscillators having a slightly different free-running frequency; each of said transceivers further comprising a receiver tunable to each of said different channels, means connected to said receiver to detect interference from nearby transmissions and means to synchronize said oscillator in frequency and phase with said nearby transmissions.

2. A radio communication system comprising a plurality of transceivers distributed at random over a given area, each of said transceivers adapted for duplex operation, each of said transceivers comprising a transmitter and a receiver, each of said transmitters adapted to emit a train of modulated radio frequency pulses at a different carrier frequency, each said different carrier frequency defining a different channel, a normally free-running oscillator connected to each of said transmitters, each of said oscillators having a slightly different free-running frequency, each oscillator being arranged to initiate each pulse of radio frequency emitted by the transmitter connected thereto; each of said receivers being tunable to each of said different channels, means connected to said receiver to detect interference from nearby transmitters and to synchronize said oscillator therewith, said means comprising, a band pass filter connected to the signal path of said receiver, said filter having a bandwidth sufficient to pass a band of said channels centered on the channel to which the receiver is tuned, a threshold detector connected to the output of said filter, said threshold detector arranged to detect the strongest interfering signal in the output of said filter, the output of said detector being applied to said oscillator to synchronize said oscillator in frequency and phase with the pulses emitted by said strongest interfering signal.

3. A radio communication system comprising a plurality of transceivers distributed at random over a given area, each of said transceivers adapted for simultaneous two-way communication, each of said transceivers comprising a transmitter and a receiver, each of said transmitters adapted to emit a train of modulated radio frequency pulses at a different carrier frequency, each said different carrier frequency defining a different channel, a normally free-running oscillator connected to each of said transmitters, each said oscillator having a slightly different free-running frequency, each said oscillator being arranged to initiate each pulse of radio frequency emitted by the transmitter connected thereto, each of said receivers being tunable to each of said different channels, each of said receivers including a transmit-receive switch in the signal path thereof for opening said signal path during transmission from the transmitter of the same station, means connected to said receiver to detect interference from nearby transmitters on nearby channels and to synchronize the oscillators of all such interfering nearby transmissions in response thereto.

4. The system of claim 3 wherein said means comprises a bandpass filter connected to the signal path of said receiver and having a bandwidth of sufficient width to pass the channel to which said receiver is tuned plus a band of channels on either side thereof, said means further comprising a threshold detector connected to the output of said bandpass filter and arranged to detect the strongest interfering signal and to apply said detected signal to said oscillator to synchronize said oscillator with said strongest interfering signal.

5. A radio transceiver comprising a transmitter and a receiver, said transmitter being adapted to emit a train of modulated radio frequency pulses, the pulse repetition rate of said transmitted pulses being determined by a normally free-running oscillator having its output connected to said transmitter, said receiver being tunable to a plurality of channels and including a transmit-receive switch in the signal path thereof which is actuated by said transmitter to prevent said transmitted pulses from entering said receiver, said receiver further including an intermediate frequency amplifier which passes only the desired one of said channels, a bandpass filter connected in parallel with said intermediate frequency amplifier, said filter having the same center frequency as said intermediate frequency amplifier but a bandwidth wide enough to pass several of said channels on either side of said desired channel, a threshold detector connected to the output of said filter, said threshold detector comprising a back-biased diode for rectifying the output of said filter above the threshold determined by said back bias, said detector further comprising a low pass filter, means to apply the output of said threshold detector to said oscillator to lock said oscillator in frequency and phase with the output of said threshold detector.

6. A duplex radio communication system in which a plurality of stations are distributed at random over a given area, each said station comprising a transmitter and a receiver, each transmitter operating on a different carrier frequency, the output of each transmitter comprising a train of modulated radio frequency pulses, each transmitter having a normally different pulse repetition rate, each receiver being tunable to each of said different carrier frequencies, each receiver having means to block the signal path thereof while the transmitter of the same station is transmitting, means connected to the signal path of each receiver to detect interference from nearby transmitters on frequencies close to the frequency to which the receiver is tuned, and means to synchronize the output pulses of said transmitter with said interference.

References Cited by the Examiner

UNITED STATES PATENTS

| | | | |
|---|---|---|---|
| 2,536,255 | 1/1951 | Bedford et al. | 325—58 |
| 2,703,362 | 3/1955 | Strandberg | 325—132 X |
| 3,104,392 | 9/1963 | Towler | 343—178 |
| 3,159,835 | 12/1964 | Gore. | |

DAVID G. REDINBAUGH, *Primary Examiner.*

JOHN W. CALDWELL, *Examiner.*